United States Patent
Date et al.

(10) Patent No.: US 8,778,428 B2
(45) Date of Patent: Jul. 15, 2014

(54) STICK-SHAPED SNACK AND METHOD FOR PRODUCING THE SAME

(75) Inventors: Takayuki Date, Takatsuki (JP); Masahiro Honda, Amagasaki (JP); Koji Oka, Kawanishi (JP); Shigeki Hayata, Ikoma (JP); Shinji Matsumoto, Kashiba (JP); Tatsumi Ootakara, Kameoka (JP)

(73) Assignee: Ezaki Glico Co., Ltd., Osaka (JP)

( * ) Notice: Subject to any disclaimer, the term of this patent is extended or adjusted under 35 U.S.C. 154(b) by 0 days.

(21) Appl. No.: 12/226,862

(22) PCT Filed: Apr. 9, 2007

(86) PCT No.: PCT/JP2007/057842
§ 371 (c)(1),
(2), (4) Date: Oct. 30, 2008

(87) PCT Pub. No.: WO2007/138790
PCT Pub. Date: Dec. 6, 2007

(65) Prior Publication Data
US 2009/0155431 A1    Jun. 18, 2009

(30) Foreign Application Priority Data
May 26, 2006 (JP) .................................. 2006-146311

(51) Int. Cl.
*A23G 3/50* (2006.01)
*A21D 13/08* (2006.01)

(52) U.S. Cl.
USPC .............................. 426/302; 426/442; 426/556

(58) Field of Classification Search
USPC .......................................... 426/302, 442, 556
See application file for complete search history.

(56) References Cited

U.S. PATENT DOCUMENTS 2,232,832 A * 2/1941 Walborn ........................ 425/307
3,821,428 A * 6/1974 Farkas ........................... 426/559

(Continued)

FOREIGN PATENT DOCUMENTS

CN    1259019 A    7/2000
EP    0 956 782    11/1999

(Continued)

OTHER PUBLICATIONS

English Translation of Operating instructions for a stick extruding machine of the company Werner & Pfleiderer.*

(Continued)

*Primary Examiner* — Humera Sheikh
*Assistant Examiner* — Saeeda Latham
(74) *Attorney, Agent, or Firm* — Posz Law Group, PLC

(57) ABSTRACT

An object of the present invention is to provide a straight stick-shaped snacks and a method for producing the same. The present invention provides a method for producing a stick-shaped snack from a string-like dough 10 containing a cereal flour as a principal component, the method including: a baking step S6 of baking the string-like dough 10 provided with a plurality of non-through cuts 15 formed therein across the longitudinal direction and impregnated with lye, the string-like dough 10 being mounted on a heating surface; and a cutting step S7 of cutting the baked string-like dough 40 at the cuts 15 to thereby form stick-shaped pastries 40.

14 Claims, 5 Drawing Sheets

(56) References Cited

U.S. PATENT DOCUMENTS

| | | | |
|---|---|---|---|
| 4,505,942 A | | 3/1985 | Ito et al. |
| 4,876,098 A | * | 10/1989 | Morgenthaler ............... 426/231 |
| 4,879,126 A | * | 11/1989 | Willard et al. ................ 426/272 |
| 5,681,605 A | | 10/1997 | Takemori et al. |
| 6,217,919 B1 | | 4/2001 | Takahara et al. |
| 6,217,921 B1 | * | 4/2001 | Lanner et al. ............... 426/103 |
| 2002/0098267 A1 | | 7/2002 | Heisey et al. |
| 2004/0213883 A1 | * | 10/2004 | Sadek et al. ................. 426/549 |

FOREIGN PATENT DOCUMENTS

| | | |
|---|---|---|
| JP | A-10-14480 | 1/1998 |
| JP | A-10-014480 | 1/1998 |
| JP | A-2004-57143 | 2/2004 |
| JP | A-2004-057143 | 2/2004 |
| JP | 3775788 B2 | 3/2006 |
| JP | A-2006-314236 | 11/2006 |
| KR | 20-0282352 Y | 7/2002 |

OTHER PUBLICATIONS

PCT International Search Report mailed on Jul. 3, 2007 for the corresponding international patent application No. PCT/JP2007/057842.

European Search Report dated Aug. 14, 2009 in corresponding European patent application No. 07 74 1278.

"Lu Mikado," (Jun. 3, 2003), NiceCupofTeaandASitDown.com, retrieved from http://www.nicecupofteaandasitdown.com/biscuits/previous.php3?item=60.

Brochure "Komplette Sticks- and Brezelanlagen: Complete Stick and Pretzel Plants" of the company Werner & Pfleiderer (and partial English translation).

Notice of Opposition dated Sep. 20, 2012 in corresponding EP Patent Application No. 2 025 239 B1 (and English translation).

Operating instructions for a stick extruding machine of the company Werner & Pfleiderer. (Cited in Notice of Opposition dated Sep. 20, 2012 in corresponding EP Patent Application No. 2 025 239 B1 (and English translation).

* cited by examiner

STICK-SHAPED SNACK AND METHOD FOR PRODUCING THE SAME

CROSS REFERENCE TO RELATED APPLICATIONS

This application is a U.S. national stage application of PCT/JP2007/057842 filed on Apr. 9, 2007, and claims priority to Japanese Patent Application No. 2006-146311 filed on May 26, 2006, the disclosures of which are incorporated herein by reference.

TECHNICAL FIELD

The present invention relates to a stick-shaped snack and a method for producing the same.

BACKGROUND OF THE INVENTION

Stick-shaped snacks, such as stick-shaped pretzels, composite snacks prepared by coating such stick-shaped pretzels with chocolate or the like, etc., are conventionally known. A method disclosed in Patent document 1 is known for producing such stick-shaped snacks.

According to this method, first, flour is mixed with sugar, oil, yeast, water, and the like and stirred to form a dough, then the dough is extruded into a string-like shape through an extruder or like device, and the extruded dough is cut to a predetermined length, yielding a stick-like shaped dough. Subsequently, the stick-like shaped dough is treated with alkali and then baked in an oven or the like, producing stick-shaped snacks. The alkali treatment is performed to provide the baked stick-shaped snacks with a robust flavor and a crispy texture, and is performed by immersing a stick-like shaped dough in lye, etc.

In general, stick-shaped snacks coated with chocolate and the like are produced by holding one end of a baked stick-like shaped dough with a clip or like holder, and immersing the other end of the baked stick-like shaped dough into a container of liquid chocolate, etc.

[Patent document 1] Japanese Unexamined Patent Publication No. 1998-14480

SUMMARY OF THE INVENTION

Problem to be Solved by the Invention

However, in the production of stick-shaped snacks by the above method, when baking the stick-like shaped dough, both ends thereof are warped and deformed, making it difficult to produce straight stick-shaped snacks.

Further, when producing stick-shaped snacks having a coating of chocolate or the like on the surface of a narrow baked stick-like shaped dough, because the baked shaped dough to be held by a holder has one end warped and bent, it is difficult to firmly hold the baked shaped dough by the holder, resulting in production problems such as the baked shaped dough rotating or dropping during the coating operation.

The present invention was accomplished to solve these problems, and is aimed at providing a straight stick-shaped snack and a method for producing the same.

Means for Solving the Problem

The above object of the present invention can be achieved by a method for producing a stick-shaped snack from a string-like dough that contains a cereal flour as a principal component, the method including a baking step of baking the string-like dough provided with a plurality of non-through cuts formed therein across the longitudinal direction and impregnated with lye, the string-like dough being mounted on a heating surface, and a cutting step of cutting the baked string-like dough at the cuts to thereby form stick-shaped pastries.

The method for producing a stick-shaped snack preferably further includes, after the cutting step, a coating step of coating at least part of the stick-shaped pastries with a coating material.

The above object of the present invention can also be achieved by a stick-shaped snack comprising a stick-shaped pastry and a coating material applied to the surface of the stick-shaped pastry. The stick-shaped pastry is formed by baking a string-like dough provided with a plurality of non-through cuts formed therein across the longitudinal direction and impregnated with lye, the string-like dough being mounted on a heating surface, and then cutting the baked string-like dough at the cuts. The maximum cross-sectional width of each stick-shaped pastry is 2.5 mm to 3.5 mm.

Effect of the Invention

According to the present invention, a straight stick-shaped snack and a method for producing the same can be provided.

EXPLANATION OF REFERENCE NUMERALS

Figure 1:
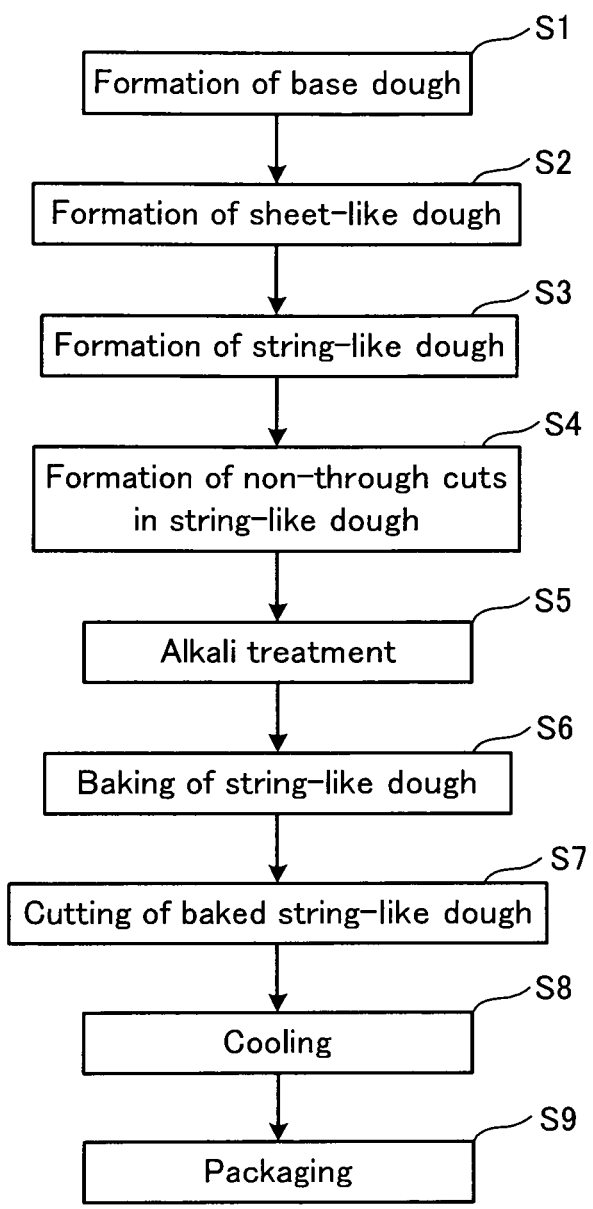
FIG. 1 is a flow chart showing the production steps for a stick-shaped snack according to one embodiment of the present invention.

1 Base dough
5 Sheet-like dough
10 String-like dough
10a Stick-shaped snack part
15 Cut
30 Heating surface
31 Heating device
40 Stick-shaped pastry

BEST MODE FOR CARRYING OUT THE INVENTION

Figure 2:
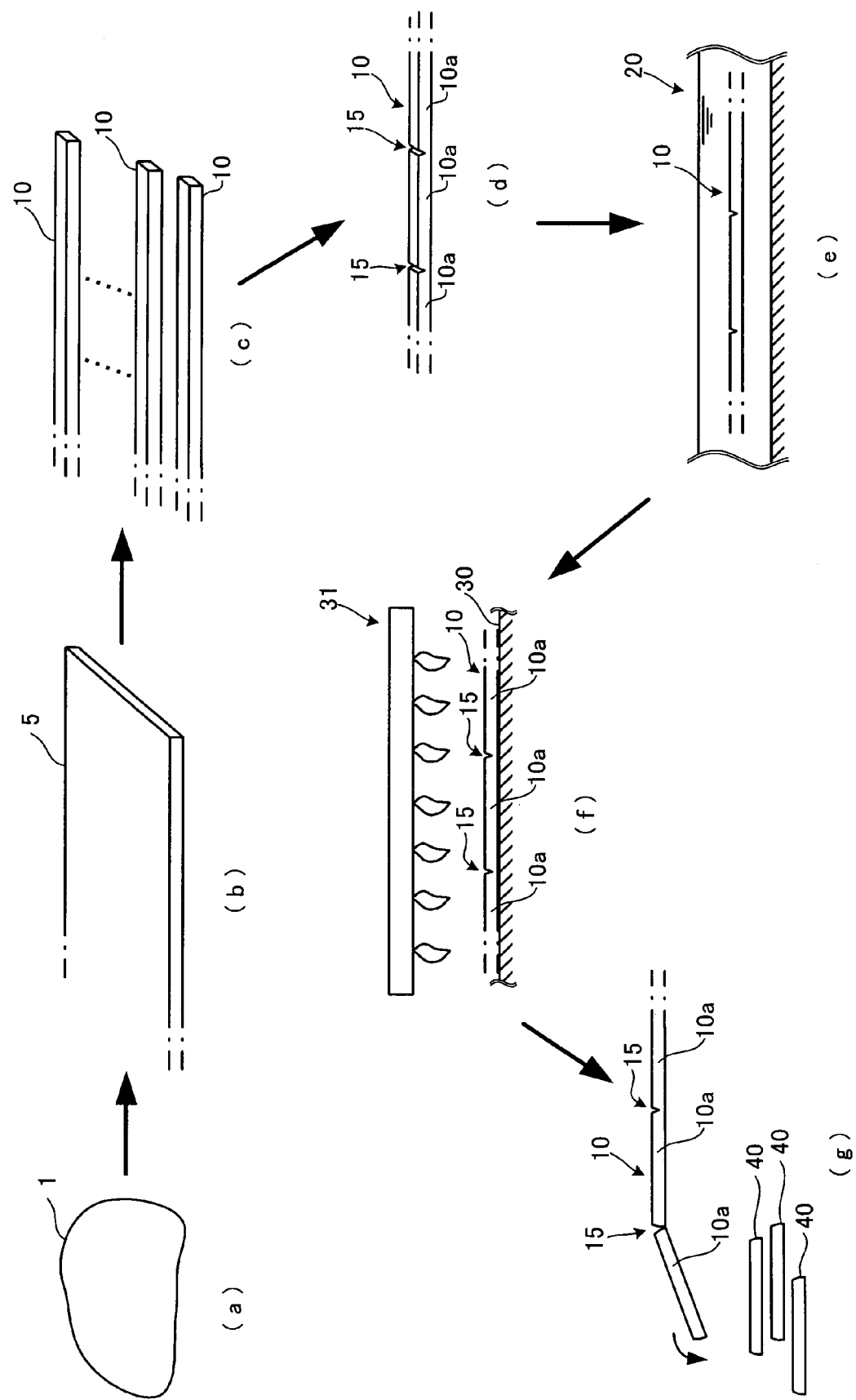
FIG. 2 is an explanatory view schematically showing the production process for the stick-shaped snack.

An embodiment of the present invention is described hereinafter with reference to the attached drawings. FIG. 1 is a flow chart showing the production steps for a stick-shaped snack, and FIG. 2 is an explanatory view schematically illustrating the production process for a stick-shaped snack. The method for producing a stick-shaped snack according to this embodiment includes, as shown in FIG. 1, a base dough forming step S1, a sheet-like dough forming step S2, a string-like dough forming step S3, a non-through cut forming step S4, an alkali treatment step S5, a baking step S6, a cutting step S7, a cooling step S8, and a packaging step S9.

For producing a stick-shaped snack, first, in the base dough forming step S1, a base dough 1 containing a cereal flour as a principal component is formed. Base dough 1 is formed by mixing and stirring a cereal flour with a saccharide, oil, water, and the like. Any conventionally known cereal flours, saccharides, and oils may be used for the present invention. Examples of usable cereal flours include flour, barley flour, rye flour, oat flour, corn flour, etc. Examples of usable saccharides include sugar, malt sugar, lactose, glucose, fructose, invert sugar, starch syrup, isomerized sugar, etc. Such saccharides are used, for example, in a proportion of 8 to 20 parts by weight per 100 parts by weight of cereal flour. Examples of usable oils include butter, shortening, margarine, liquefied oil, hardened oil, etc. Such oils are used, for example, in a proportion of 5 to 15 parts by weight per 100 parts by weight of cereal flour. If necessary, proper amounts of other raw materials, such as dairy products, eggs, salt, flavorings, flavor enhancers, yeast, expansive additives, and like food additives, may be added to form the base dough 1.

Next, using a sheet roller or the like, as shown in FIG. 2(b), the base dough 1 is rolled into a sheet-like shape to give a sheet-like dough 5 having a thickness of about 2 mm to about 3 mm (sheet-like dough forming step S2). When rolling the base dough 1, if the dough is rolled too thinly in one operation, the resulting sheet-like dough 5 may have a rough surface or holes formed therein, deteriorating the appearance or strength of the product. Therefore, the base dough 1 is preferably rolled while gradually reducing the distance between the rollers of the sheet roller so that the thickness of the sheet-like dough 5 is gradually reduced.

Subsequently, as shown in FIG. 2(c), in the string-like dough forming step S3, the sheet-like dough 5 is cut in the shape of a string having a width of 2 mm to 3 mm, forming a string-like dough 10.

In the non-through cut forming step S4, as shown in FIG. 2(d), a plurality of non-through cuts 15 are made on the string-like dough 10 at predetermined intervals along the longitudinal direction of the string-like dough 10. Each portion of the string-like dough 10 between such cuts 15 is a stick-shaped snack part 10a that is equivalent to one stick-shaped snack, the final product. The interval L between cuts 15 is preferably set at, for example, 50 mm to 150 mm. The shape of the cuts 15 is not limited. The shape may be such that the lower side of the string-like dough 10 is left uncut as shown in FIG. 2(d). Alternatively, cuts 15 may also be formed from both sides of the string-like dough 10 in the thickness direction, or instead formed around the entire periphery at predetermined positions of the string-like dough 10.

Then, in the alkali treatment step S5, the string-like dough 10 provided with a plurality of non-through cuts 15 formed therein is subjected to alkali treatment and impregnated with lye. Alkali treatment is performed, for example, as shown in FIG. 2(e), by immersing the string-like dough 10 in an alkali bath 20 containing lye. Lye examples include an aqueous solution of one or two alkali bases such as sodium hydroxide, potassium phosphate, calcium phosphate, sodium phosphate, potassium carbonate, calcium carbonate, etc. When using sodium hydroxide or like strong alkali as an alkali base, the concentration of the lye is preferably about 0.1% by weight to about 2.0% by weight, and more preferably about 0.5% by weight to about 1.5% by weight. When using, as an alkali base, sodium phosphate, potassium phosphate, calcium phosphate, sodium carbonate, potassium carbonate, calcium carbonate, or like weak alkali, the concentration is preferably about 1.0% by weight to about 10.0% by weight, and more preferably about 2.0% by weight to about 8.0% by weight. A lye concentration set as above can provide a stick-shaped snack with a robust flavor and a crispy, pleasant texture. The effects of the alkali treatment change depending on the concentration of the alkali base, the temperature of the lye, and the amount of time that the string-like dough 10 is immersed therein. Therefore, the concentration of the lye is suitably adjusted in accordance with the temperature of the lye that is actually used and the amount of time that the string-like dough 10 is immersed therein. Alkali treatment may be performed, for example, by spraying lye onto the string-like dough 10.

In the baking step S6, as shown in FIG. 2(f), the string-like dough 10 provided with a plurality of non-through cuts 15 formed therein across the longitudinal direction and impregnated with lye is mounted on a heating surface 30 such as a heavy mesh, a light mesh, a steel belt, or the like, and baked in a heating device 31. Heating device 31 may be, for example, a fixed oven, a continuous oven, a direct oven, a convection oven, or the like. The baking time changes depending on the thickness of the string-like dough 10, and is usually 2 minutes to 20 minutes at 100° C. to 350° C.

After the baking step S6 is completed, in the cutting step S7, as shown in FIG. 2(g), the baked string-like dough 10 is cut at the non-through cuts 15, forming stick-shaped pastries 40. The cut stick-shaped pastries 40 are subsequently cooled in the cooling step S8 by being passed though a cooling tunnel or by a like operation, then packaged in a packaging step S9, and shipped as stick-shaped snack products.

In the above baking step S6, baking proceeds with the stick-shaped snack parts 10a of the string-like dough 10 being connected to one another. That is, baking proceeds such that the connected stick-shaped snack parts 10a each prevent warping at the ends of the neighboring stick-shaped snack parts 10a. This can prevent deformation of the string-like dough 10 after baking. As a result, it becomes possible to manufacture straight stick-shaped snacks without warping. In particular, even when making a thin stick-shaped pastry 40 with a maximum cross-sectional width of, for example, about 2.5 mm to about 3.5 mm, warping can be effectively prevented, enabling straight stick-shaped snacks. Stick-shaped snacks having a maximum cross-sectional width of 2.5 mm to 3.5 mm are thinner than conventional stick-shaped snacks, and thus are very easy to eat and have an enjoyable new texture, encouraging consumers to buy them.

Further, because the stick-shaped snack parts 10a are connected to one another as described above, and also because the surface of the string-like dough 10 (stick-shaped snack parts 10a) is moistened with lye when baking starts, the joint portions of stick-shaped snack parts 10a provide better adhesion between the joint portions and the heating surface 30 than when the stick-shaped snack parts 10a are disconnected. This can effectively suppress the separation of the joint portions of the stick-shaped snack parts 10a from the heating surface 30, thus preventing warping at both ends of the stick-shaped snack parts 10.

In addition, because the moisture in the string-like dough 10 escapes from the non-through cuts 15 at both ends of the stick-shaped snack parts 10a, it becomes possible to prevent variation in the amount of moisture remaining in the string-like dough 10. This can effectively prevent warping of the stick-shaped snack due to variation in the amount of moisture remaining in the string-like dough 10.

The above description explains one embodiment of the present invention, but the embodiment of the present invention is not limited thereto. Although, according to this embodiment, non-through cuts 15 are formed after the string-like dough forming step S3 is completed and before the alkali treatment step S5 is started, the construction is not limited thereto and may be such that, for example, non-through cuts 15 are formed in the string-like dough 10 after the alkali treatment step S5 is completed and before the baking step S6 is started. Alternatively, non-through cuts 15 may also be formed in a sheet-like dough 5 after the sheet-like dough forming step S2 is completed and before the string-like dough forming step S3 is started.

Figure 3:
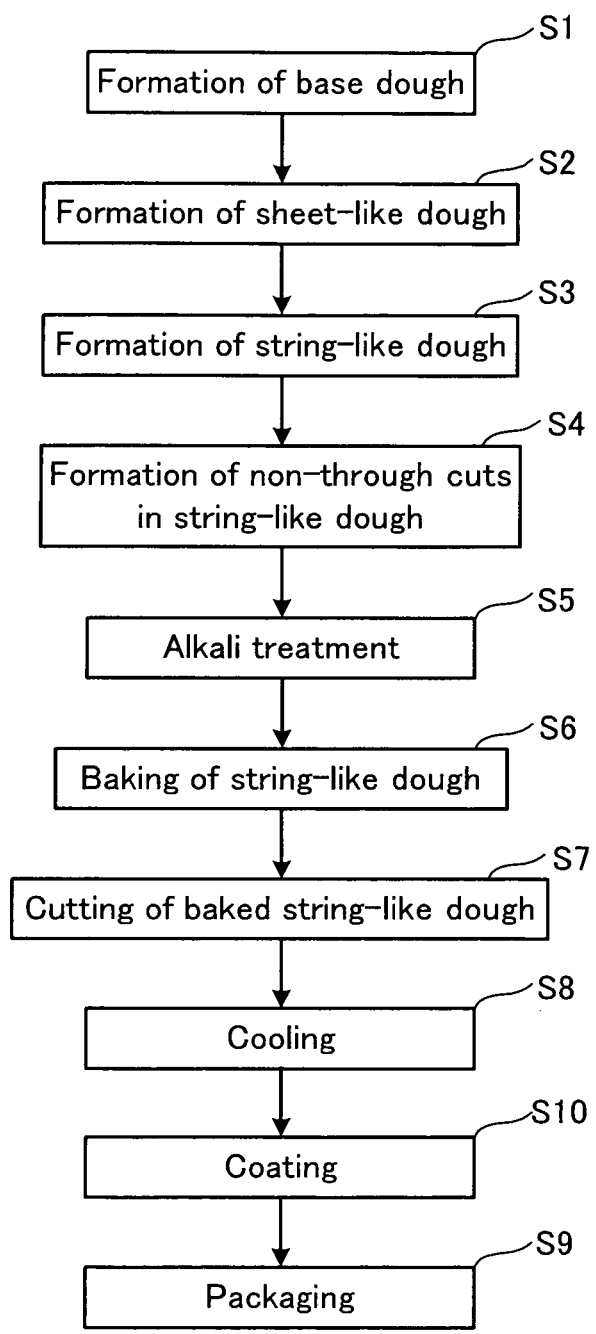
FIG. 3 is a flow chart showing the production steps for the stick-shaped snack shown in FIG. 1 according to another embodiment.
Figure 4:
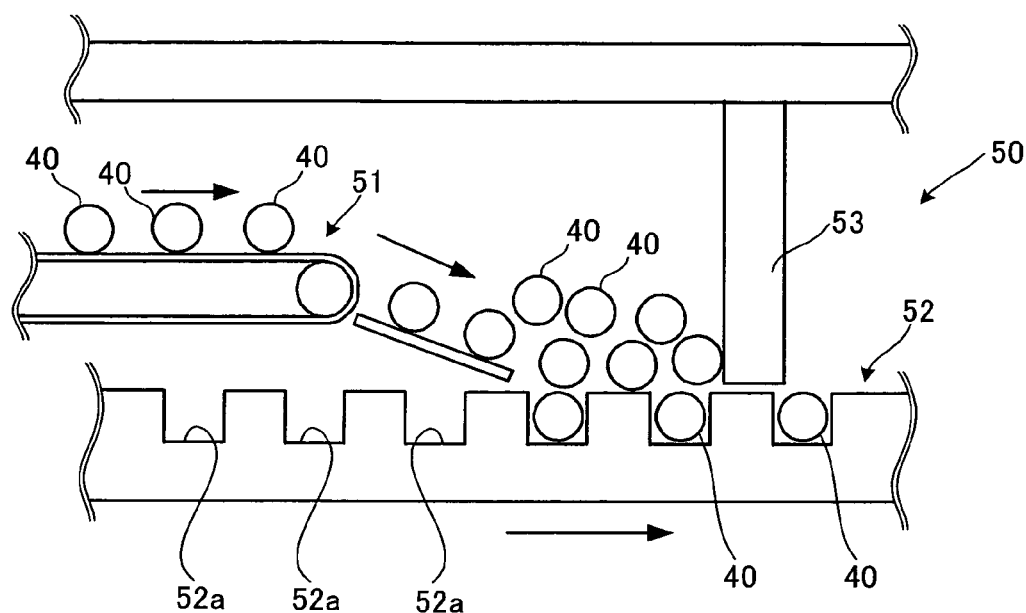
FIG. 4 is a schematic diagram showing an example of an aligning device used in a coating step.
Figure 5:
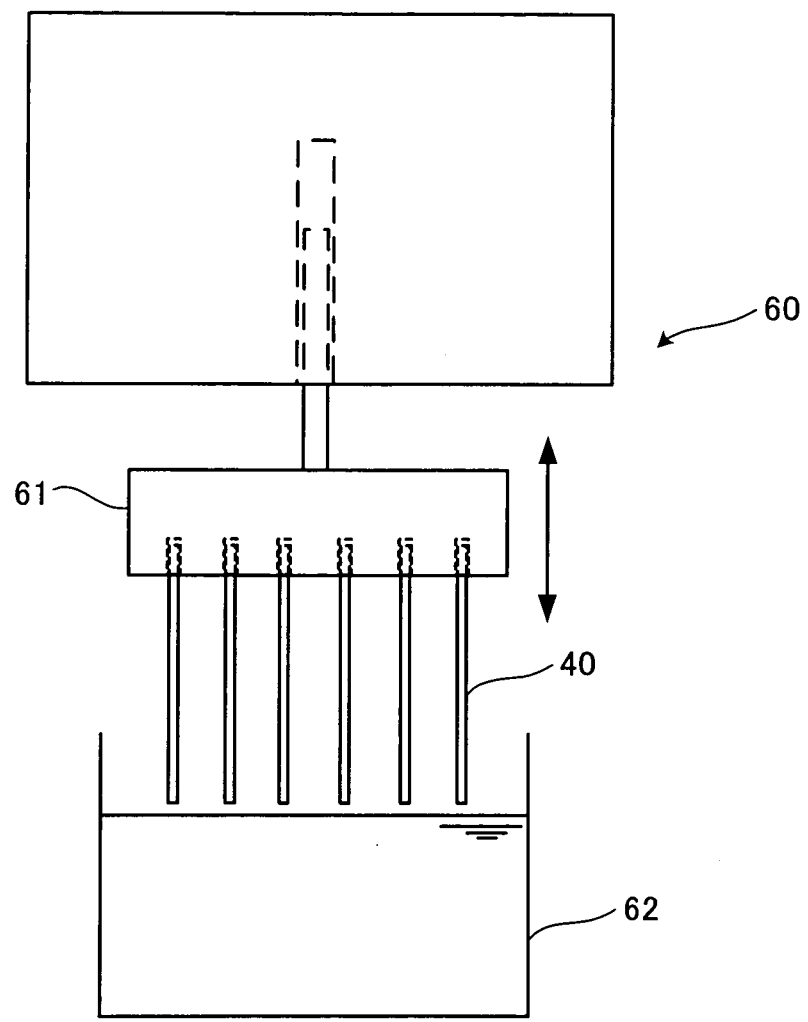
FIG. 5 is a schematic diagram showing an example of a holding device used in a coating step.

This embodiment may further have, for example, as shown in the flow chart of the production process of FIG. 3, after the cutting step S7, a coating step S10 which coats at least part of the stick-like pastry 40 with chocolate, cream, or like coating material. To coat the stick-shaped pastries 40 with a coating material, for example, after the stick-shaped pastries 40 are aligned at regular intervals using an aligning device 50 as shown in FIG. 4, one end of each stick-shaped pastry 40 is held by a holder 61 of a holding device 60 as shown in FIG. 5, and the other end of each stick-shaped pastry 40 is immersed in a container 62 containing a liquid coating material. Subsequently, the stick-shaped pastries 40 are pulled up and, in order to remove the excessive coating material adhering to the surfaces of the stick-shaped pastries 40, the stick-shaped pastries 40 are tapped while being held by the holder 61. Further, while being held, the stick-shaped pastries 40 are passed through a cooling tunnel in which a cold wind circulates, so that the coating material on the surfaces of the stick-shaped pastries 40 solidifies.

An aligning device 50 has a carrying conveyor 51 for supplying stick-shaped pastries 40, an aligning conveyor 52 with a slot 52a in the upper surface for receiving each stick-shaped pastry 40, and an aligning guide plate 53 for guiding the stick-shaped pastries 40, which are supplied from the carrying conveyor 51 onto the upper surface of the aligning conveyor 52, to the slots 52a. The stick-shaped pastries 40 that are supplied from the carrying conveyor 51 to the upper surface of the aligning conveyor 52 are, by the aligning guide plate 53, rolled along the upper surface of the aligning conveyor 52 and eventually received in the slots 52a. A holding device 60 is capable of moving the stick-shaped pastries 40 while placing the pastries into an upright position or a horizontal position, with the holder 61 holding one end of each of the plurality of stick-shaped pastries 40 arranged on the aligning conveyor 52 of the aligning apparatus 50.

The method for producing a stick-shaped snack of this embodiment enables the production of a straight stick-shaped pastry 40 without warping. Therefore, in a coating operation, the holder 61 of the holding device 60 can firmly hold one end of each of the stick-shaped pastries 40. Therefore, the stick-shaped pastries 40 can be reliably prevented from rotating or dropping from the holder 61, thus enabling the efficient production of stick-shaped snacks coated with a coating material.

Further, when the holder 61 holds the ends of the stick-shaped pastries 40, if the stick-shaped pastries 40 are warped at the end, the alignment may fail as the ends of adjacent stick-shaped pastries 40 (the ends on the side not held by the holder 61) may approach or come into contact with each other. In such a case, the adjacent stick-shaped pastries 40 may be joined via the coating material on the stick-shaped pastries 40. However, using the method for producing a stick-shaped snack according to this embodiment, straight stick-shaped pastries 40 can be produced, and the above inconvenience can thus be reliably avoided, making it possible to efficiently produce stick-shaped snacks coated with a coating material.

When the stick-shaped pastries 40 are rolled, received in the slots 52a, and thereby aligned on the aligning conveyor 52 of the aligning device, if the stick-shaped pastries 40 are warped, the stick-shaped pastries 40 are difficult to roll, thus making it difficult to efficiently receive the stick-shaped pastries 40 in the slots 52a and thereby align the same. However, using the method for producing a stick-shaped snack according to this embodiment, straight stick-shaped pastries 40 with no warping can be produced, and, the above problem can thus be reliably avoided, making it possible to efficiently align the stick-shaped pastries 40.

Even if the stick-shaped pastries 40 are so thin that the maximum cross-sectional width is, for example, 2.5 mm to 3.5 mm, coating the surfaces of the stick-shaped pastries 40 with a coating material makes it possible to produce a stick-shaped snack that is strong and does not easily break.

Stick-shaped pastries 40 can be coated with a coating material by a method that immerses the stick-shaped pastries 40 in a container 62 containing a liquid coating material as described above, and also by spraying a coating material on the surfaces of the stick-shaped pastries 40, or pouring a liquid coating material in the shape of a curtain, and passing stick-shaped pastries 40 placed on a conveyor thereunder, etc.

The invention claimed is:

1. A method for producing a stick-shaped snack, comprising:
    a step of forming solid dough containing a cereal flour as a principal component,
    a rolling step of rolling the solid dough into a solid dough sheet having a predetermined thickness,
    a first cutting step of cutting through the solid dough sheet and forming solid string-shaped dough having string shapes,
    a second cutting step of partially cutting the solid string-shaped dough at predetermined intervals along a longitudinal direction of the solid string-shaped dough and providing a plurality of non-through cuts formed therein, the partially cutting extending in a widthwise direction of the solid string-shaped dough, the second cutting step forming a plurality of solid stick-shaped snack parts held together by joint portions formed about the non-through cuts, the joint portions holding the solid stick-shaped snack parts together during impregnating and baking steps that follow,
    an impregnating step of impregnating the solid string-shaped dough having the plurality of non-through cuts therein with lye,
    a baking step of baking the lye impregnated solid string-shaped dough, which includes mounting the lye impregnated solid string-shaped dough on a heating surface, and during the baking moisture escapes from the joint portions at both ends of the stick-shaped snack parts through the non-through cuts that prevents warping of the stick-shape snack parts by preventing variations in amounts of moisture remaining in the solid stick-shaped snack parts, and
    a third cutting step of cutting through the baked solid string-shaped dough at the joint portions formed about the non-through cuts and forming stick-shaped pastries having a maximum cross-sectional width of 2.5 mm to 3.5 mm and with each end of the stick-shaped pastry having a non-through cut portion with a baked color due to the baking step and another portion without the baked color.

2. The method for producing a stick-shaped snack according to claim 1, further comprising, after the third cutting step, a coating step of coating at least part of the stick-shaped pastries with a coating material.

3. The method for producing a stick-shaped snack according to claim 1, wherein the second cutting step includes partially cutting through the solid string-shaped dough on both sides of the solid string-shaped dough at the predetermined intervals along the longitudinal direction of the solid string-shaped dough.

4. The method for producing a stick-shaped snack according to claim 1, wherein the rolling step includes rolling the solid dough between rollers while gradually reducing the distance between the rollers.

5. A method for producing a stick-shaped snack, comprising:
   a step of forming solid dough containing a cereal flour as a principal component,
   a rolling step of rolling the solid dough into a solid dough sheet having a thickness of 2 mm to 3 mm,
   a first cutting step of cutting through the solid dough sheet and forming solid string-shapes having a width of 2 mm to 3 mm,
   a second cutting step of partially cutting the solid string-shaped dough at predetermined intervals along a longitudinal direction of the solid string-shaped dough and providing a plurality of non-through cuts formed therein, the partially cutting extending in a widthwise direction of the solid string-shaped dough, the second cutting step forming a plurality of solid stick-shaped snack parts held together by joint portions formed about the non-through cuts, the joint portions holding the solid stick-shaped snack parts together during impregnating and baking steps that follow,
   an impregnating step of impregnating the solid string-shaped dough having the plurality of non-through cuts therein with lye,
   a baking step of baking the lye impregnated solid string-shaped dough, which includes mounting the lye impregnated solid string-shaped dough on a heating surface, and during the baking moisture escapes from the joint portions at both ends of the stick-shaped snack parts through the non-through cuts that prevents warping of the stick-shape snack parts by preventing variations in amounts of moisture remaining in the solid stick-shaped snack parts, and
   a third cutting step of cutting through the baked solid string-shaped dough at the joint portions formed about the non-through cuts formed therein and forming stick-shaped pastries and with each end of the stick-shaped pastry having a non-through cut portion with a baked color due to the baking step and another portion without the baked color.

6. The method for producing a stick-shaped snack according to claim 5, further comprising, after the third cutting step, a coating step of coating at least part of the stick-shaped pastries with a coating material.

7. The method for producing a stick-shaped snack according to claim 6, further comprising:
   prior to the third cutting step, an aligning step of aligning the stick-shaped pastries parallel to each other, and
   wherein the coating step includes holding one end of each stick-shaped pastry while immersing another end of each stick-shaped pastry in the coating material.

8. The method for producing a stick-shaped snack according to claim 5, wherein the second cutting step includes partially cutting through the solid string-shaped dough on both sides of the solid string-shaped dough at the predetermined intervals along the longitudinal direction of the solid string-shaped dough.

9. The method for producing a stick-shaped snack according to claim 5, wherein the rolling step includes rolling the solid dough between rollers while gradually reducing the distance between the rollers.

10. A method for producing a stick-shaped snack, comprising:
    a step of forming solid dough containing a cereal flour as a principal component,
    a rolling step of rolling the solid dough into a solid dough sheet having a thickness of 2 mm to 3 mm,
    a first cutting step of cutting through the solid dough sheet and forming the solid string-shaped dough having string shapes with a width of 2 mm to 3 mm,
    a second cutting step of cutting the solid string-shaped dough at predetermined intervals along a longitudinal direction of the solid string-shaped dough and forming a plurality of solid stick-shaped snack parts held together by joint portions, the joint portions extending in a widthwise direction of the solid stick-shaped snack parts,
    an impregnating step of impregnating the solid string-shaped dough having the plurality of non-through cuts therein with lye and strengthening the joint portions holding the solid stick-shaped snack parts together,
    a baking step of baking the lye impregnated solid string-shaped dough, which includes mounting the lye impregnated solid string-shaped dough on a heating surface, while moisture escapes from the joint portions at both ends of the stick-shaped snack parts through the non-through cuts and prevents warping of the stick-shaped snack parts by preventing variations in amounts of moisture remaining in the solid stick-shaped snack parts, all while the joint portions hold the solid stick-shaped snack parts together, and
    a third cutting step of cutting through the joint portions holding the solid stick-shaped snack parts together and forming solid stick-shaped pastries having a maximum cross-sectional width of 2.5 mm to 3.5 mm.

11. The method for producing a stick-shaped snack according to claim 10, wherein the second cutting step of partially cutting through the solid string-shaped dough on both sides of the solid string-shaped dough at the predetermined intervals along the longitudinal direction of the solid string-shaped dough.

12. The method for producing a stick-shaped snack according to claim 10, wherein the rolling step includes rolling the solid dough between rollers while gradually reducing the distance between the rollers.

13. The method for producing a stick-shaped snack according to claim 10, if further comprising:
    prior to the third cutting step, an aligning step of aligning the stick-shaped pastries parallel to each other, and
    after the third cutting step, a coating step of coating at least part of the stick-shaped pastries with a coating material,
    wherein the coating step includes holding one end of each stick-shaped pastry while immersing another end of each stick-shaped pastry in the coating material.

14. A stick-shaped snack made by the method of claim 1.

* * * * *